United States Patent
Porikli et al.

(10) Patent No.: US 8,401,239 B2
(45) Date of Patent: Mar. 19, 2013

(54) OBJECT TRACKING WITH REGRESSING PARTICLES

(75) Inventors: Fatih M. Porikli, Watertown, MA (US); Pan Pan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 996 days.

(21) Appl. No.: 12/413,628

(22) Filed: Mar. 30, 2009

(65) Prior Publication Data

US 2010/0246997 A1    Sep. 30, 2010

(51) Int. Cl.
*G06K 9/00* (2006.01)
(52) U.S. Cl. .................. 382/107; 382/100; 382/276
(58) Field of Classification Search .................. 382/100, 382/107, 209, 291, 254, 155, 248, 253, 276, 382/277, 280, 281, 302
See application file for complete search history.

(56) References Cited

U.S. PATENT DOCUMENTS

| | | | | |
|---|---|---|---|---|
| 6,134,344 A * | 10/2000 | Burges | .................. | 382/155 |
| 7,747,150 B2 * | 6/2010 | Anai et al. | .................. | 396/55 |
| 7,751,643 B2 * | 7/2010 | Zavadsky et al. | .................. | 382/274 |
| 7,961,952 B2 * | 6/2011 | Porikli et al. | .................. | 382/209 |
| 2005/0180626 A1 * | 8/2005 | Moon et al. | .................. | 382/159 |
| 2007/0263924 A1 * | 11/2007 | Kochi et al. | .................. | 382/154 |
| 2008/0063285 A1 * | 3/2008 | Porikli et al. | .................. | 382/190 |
| 2009/0087023 A1 * | 4/2009 | Porikli et al. | .................. | 382/103 |
| 2009/0175500 A1 * | 7/2009 | Kizuki et al. | .................. | 382/103 |
| 2011/0052013 A1 * | 3/2011 | Sasahara et al. | .................. | 382/118 |

* cited by examiner

*Primary Examiner* — Bhavesh Mehta
*Assistant Examiner* — Shefali Goradia
(74) *Attorney, Agent, or Firm* — Dirk Brinkman; Gene Vinokur

(57) ABSTRACT

Embodiments of the invention provide a method and a system for tracking an object from a training image to a target image. The training image and the target image are elements of a sequence of images. The object in the training image is represented by an object state. First, a set of particles is acquired, wherein each particle in the set of particles is associated with a weight, such that the particle represents the object state with a probability equal to the weight. Next, a regression function is applied to each particle in the set of particles based on a target image to determine a set of moved particles and the object state is updated according to the set of moved particles, such that the object state represents the object in the target image.

12 Claims, 6 Drawing Sheets

100

600

Input: Location of target at time $t-1$ is $M_{t-1}$ and the current observation is $I_t$.

- $j = 1$ and $M_{t,1} = M_{t-1}$
- Repeat
  - $\Delta M_{t,j} = f(o_t(M_{t,j}^{-1}))$
  - $M_{t,j+1} = M_{t,j} \cdot \Delta M_{t,j}$
  - $j = j + 1$
- Until $\Delta M_t == I$ or $L(M_{t,j-1}, t) > L(M_{t,j}, t)$

Fig. 6

OBJECT TRACKING WITH REGRESSING PARTICLES

FIELD OF THE INVENTION

This invention relates generally to a method for image processing and computer vision, and more particularly to a method for tracking objects.

BACKGROUND OF THE INVENTION

Tracking is the process of estimating a motion of an object in a sequence of images. Method for tracking objects generally require that the object is detected in some initial image. Then, the object can be tracked in subsequent images. Tracking methods can generally be classified as state-space estimators, model alignment, and localized kernel searches methods.

State-Space Estimator Method

State-space estimator methods typically use a Markovian process, and construct a probability density function (pdf) of motion parameters. For example, Kalman filtering uses a normal distribution. However, the Kalman filtering method fails to describe multi-modal distributions.

Monte Carlo integration methods, e.g., particle filters, can track any parametric variation including a pose of the object. However, those methods dependend on random sampling and tend to degenerate estimated likelihoods, especially for higher dimensional representations. Moreover, the computational requirements of those method grow exponentially as a the number of state variables, which makes those methods unsuitable for tracking complex pose changes.

Model Alignment Method

Model alignment methods define a cost function based on a difference between an object model and an object as seen in an image. The cost function is solved by minimizing motion parameters. One example is optical flow estimation, where a sum of squared differences between the object model and the image intensities are minimized as an iterative least squares problem. A major difficulty of that method is the computation of the image gradients, the Jacobian and the Hessian matrices, for each iterations, which makes that method slow.

Other model alignment methods overcome the difficulty by alternative formulations of the motion and the cost function relation. In some methods, the motion is estimated using a linear function of the image gradient, which is learned in an off-line process. That idea is extended to learn a non-linear mapping from images to the motions using relevance vector machine.

But, those methods estimate the additive updates to the motion parameters via linearization. Thus, those methods cannot track non-linear motions.

Localized Kernel Searches

In contrast, kernel based methods represent an object as an image region, and search for the same region using the previous location as a prior probability. That search is imposed as an exhaustive matching process or as an iterative density gradient estimation. Kernel methods often require an object to have overlapping areas between consecutive frames. Due to the primitive object representations, e.g. histograms and templates, the kernel based methods cannot discriminate pose variations, and are confined to the translational motion.

Lie Group Theory for Motion Estimation

Lie algebra can be used to find modes of a distribution having Euclidean motion group structure, for rigid motion estimation using a mean shift operation. It is known that the mean shift operation can fail when the motion is large. A vector addition operation is defined on the Lie algebra to integrate series of affine motions for tracking an affine 'snake'.

Additive updates are performed on the Lie algebra for template tracking. However, that approach fails to account for the non-commutativity of the matrix multiplications, and the estimations are only valid near the initial transformation of the object.

One tracking method based on Lie algebra minimizes a first order approximation to a geodesic error and reports very satisfactory pose tracking results especially when the object motion is not large, see U.S. patent application Ser. No. 11/862,554 filed by Porikli et al. for "Method and System for Detecting and Tracking Objects in Images," and incorporated herein by reference.

It is desired to track an object in a sequence of images using particle filters even for complex pose changes.

SUMMARY OF THE INVENTION

It is an object of the invention to provide a method for object tracking.

It is a further object of the invention to provide such a method that allows tracking objects with sufficiently large motion.

The problem of tracking object with sufficiently large motion is solved by using a particle filter and regressing each particle on a transformation space where the mapping function is learned by regression on Lie algebra. Embodiments of the invention demonstrate superior tracking performance in comparison with a regression tracker and a particle filter.

Embodiments of the invention disclose the method that inherits merits of both the particle filtering and the regression tracking on the Lie algebra.

Unlike the regression tracking, the method estimates parametric variations of the object even if the variations are significantly large, due to the particle filter. In addition, due to the regression, the computational requirements of the method stay minimal (real-time), which enables tracking of complex pose changes, such as, affine transformation. In addition, the adopted low-level features (orientation histograms) make pose tracking in monocular sequences possible.

BRIEF DESCRIPTION OF THE DRAWINGS

FIG. 6 is a block diagram of pseudo code for a tracking method according to an embodiment of the invention.

DETAILED DESCRIPTION OF THE PREFERRED EMBODIMENT

Figure 1:
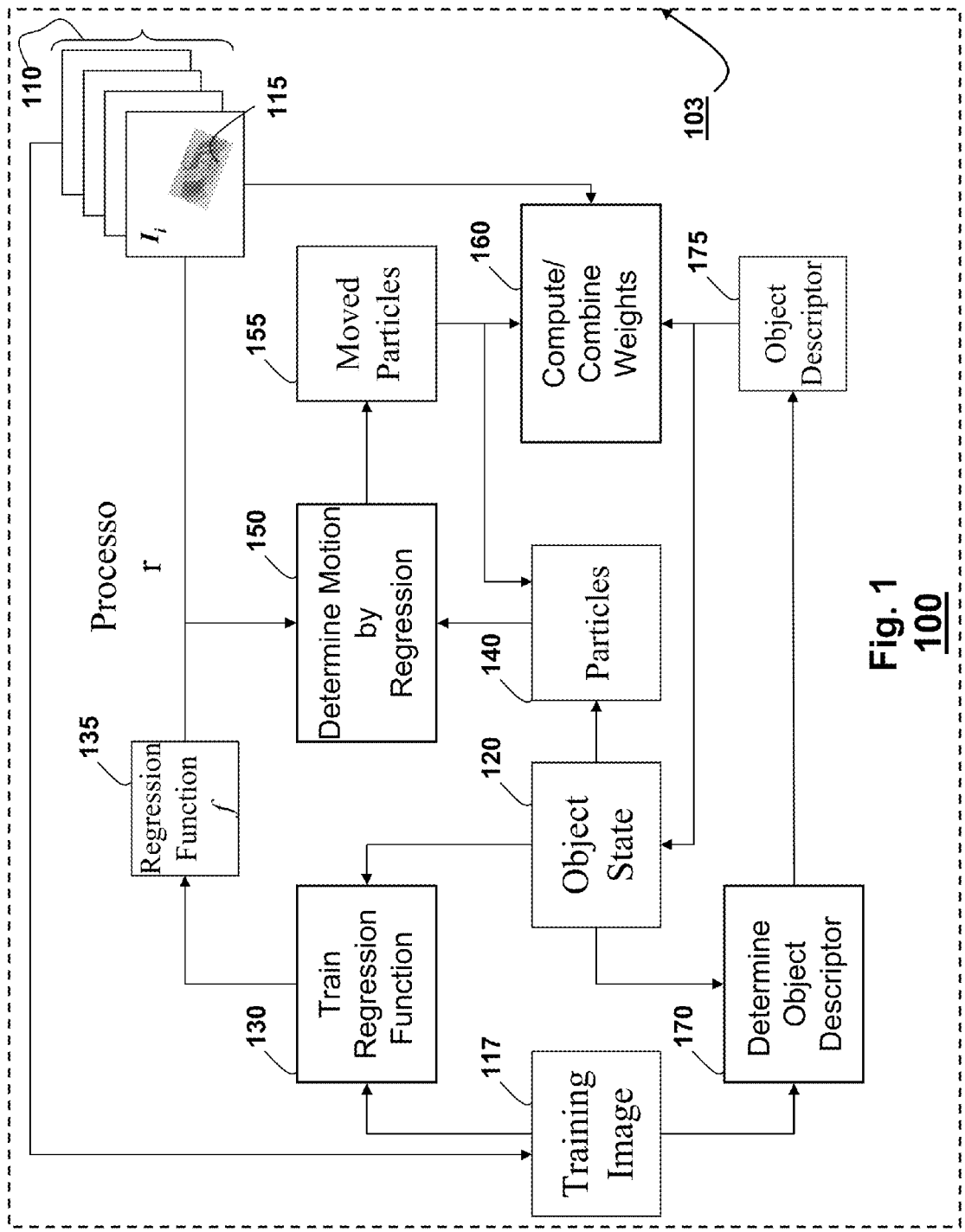
FIG. 1 is a flow diagram of a method for tracking an object in a sequence of the images according to an embodiment of the invention.

FIG. 1 shows a method and system 100 for tracking a moving object 115 in a sequence of images $I_t$ 110 according to the embodiments of the invention. The sequence of the images 110 can be acquired by a camera. Alternatively, the sequence 110 can be provided to the method 100 from a persistent memory, or a communication interface. Without a loss of generality, the method 100 is described for non-linear motion of the object 115. However, the method can track objects with any type of motion.

The method 100 can operate in a processor or microprocessor 103 connected to a display device (not shown), such as a television, projector, playback device, the camera, or computer as known in the art. The display device can be used to view the motion of the object by a user of the system.

Computers typically include one or more processing units and/or microcontroller, memories, and input/output interfaces connected by buses. The memories can include volatile memories, e.g., RAM, for storing current images as described below. The processor can also have access to persistent memory, e.g., removable storage media such as video tapes and DVD storing the sequence of images 110, as well as communication interface, such as set-top boxes, network interfaces and the like. It should be understood, that the method can also track objects when the sequence of images 110 is acquired in real-time.

Input to our method is a sequence of images 110. The images include a moving object 115. Typically, the sequence of images are frames of a video. An initial image of the sequence 110 is called a training image. For the training image 117, an object state 120, e.g., object location, orientation, and scale, is known. An image $I_i$ from the sequence of images, where the object needs to be detected or tracked during current itteration of the method 100, is called a target image.

Please note, that in one embodiment, the target image becomes the training image for a subsiquent itteration of the method 100. However, in another embodiment the training image 117 is unchanged during the whole execution of the method 100.

We train 130 a regration function 135 from the training image 117 and the object state 120. The regration function training is described below, as well as in U.S. patent application Ser. No. 11/862,554 filed by Porikli et al. on Sep. 27, 2007 for "Method and System for Detecting and Tracking Objects in Images," and incorporated herein by reference.

As stated before, we can retrain the regression function 135 for every or some of target images, when the target image substitute the training image. Alternatively, we can preserve the regression, function for the Whole execution of the method 100.

We represent each target image $I_i$ of the sequence 110 as a set of particles 140. We determine 150 motions 155 of each particle of the set 140. The motions 155 of the particles 140 is determined using the regression function 135 and feature representation of each particle, e.g., weighted orientation histogram, compared with the target image $I_i$, as described in greater details below.

Particles 140 represented by a posterior density function of the object 115 by a set of random particles of the object 115 associated with weights, wherein the weight describe a probability of the particle matches the object 115. In one embodiment, we draw samples from a Gaussian probability density of the object state 120. Alternatively, the moved particles 155 can be used as the particles 140 for the subsequent iteration of the method 100.

The realization behind this invention is that the moved particles 155 based on the regression function 135 better represent the motion of the object 115. Hence, by computing and combining 160 weights associated with moved particles, new value of the object state 120 of the object 115 is determine with a greater accuracy.

As described in greater details below, the step 160 utilizes an object descriptor 175, determined 170 based on the training image 117 and current value of the object state 120.

Regression as a Tracking Mechanism

The embodiments of the invention are described for parametric motion transformation A(2) of the object 115. The parametric transformation is a function of parameters applied to the given variables. The variables include the pixel features, the region features, the pixel coordinates, and the region coordinates. The parameters include, e.g., affine, perspective motion transformations, and other linear, non-linear, rigid and non-rigid motion transformation that can be represented by a finite number of parameters. The invention can also be used with other motion transformations, e.g., similarity transform S(2), and Euclidean motion SE(2).

A two-dimensional parametric transformation A(2) is given by a 3×3 matrix $$M = \begin{pmatrix} A & b \\ 0 & 1 \end{pmatrix}, \quad (1)$$

where A is a non-singular 2×2 matrix for representing rotation, scale and skew, and $b \in \mathfrak{R}^2$. The set of all parametric transformations forms a matrix Lie group structure. The Lie group is a differentiable manifold. Operations on the group are compatible with a smooth structure. Because Lie groups are manifolds, they can be operated on by differential calculus. A global Lie group can be replaced by a local or linearized version known as its Lie algebra. The Lie algebra is an algebraic structure that can be used to operate on geometric objects such as Lie groups and differentiable manifolds.

Figure 2:
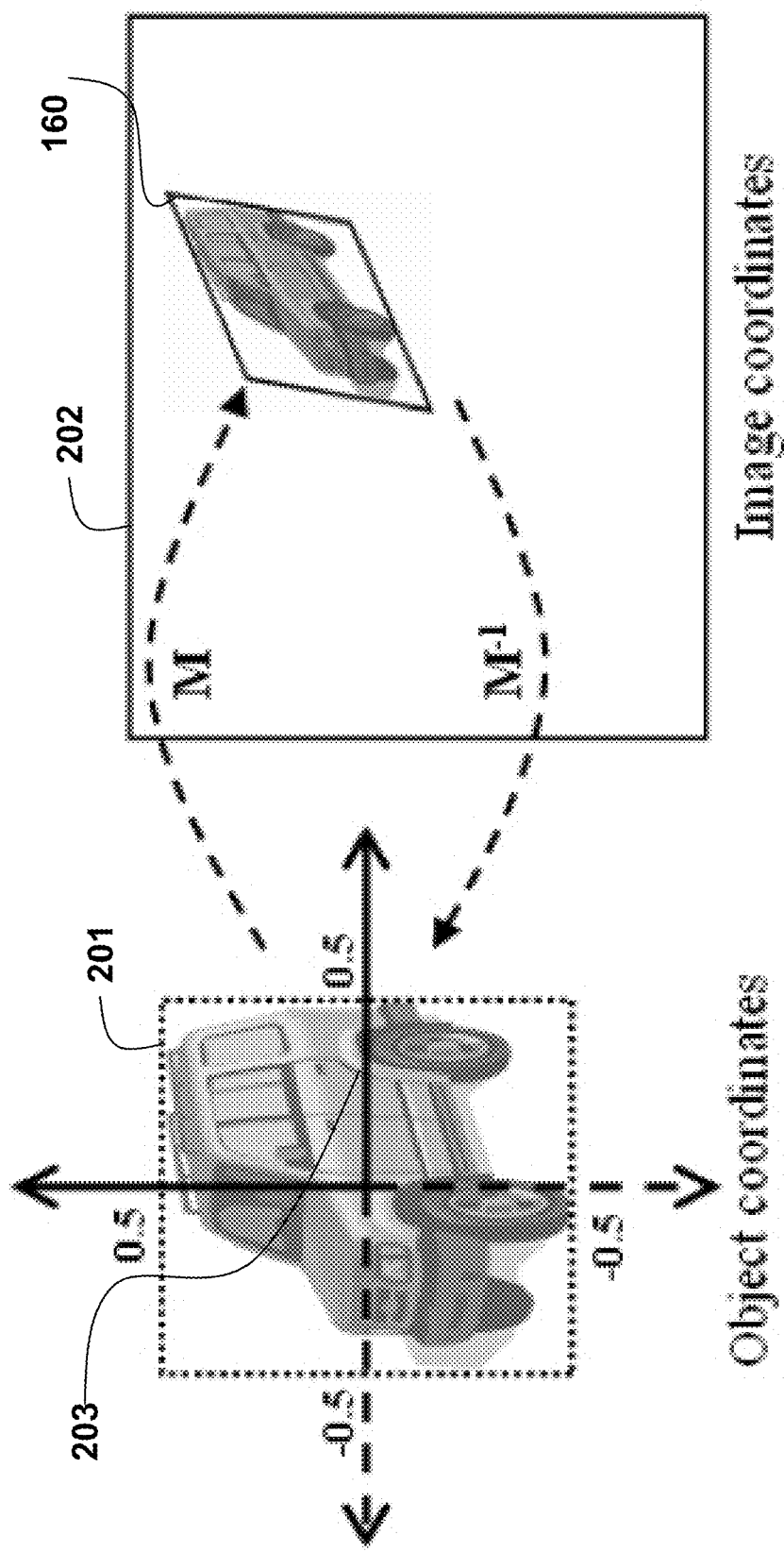
FIG. 2 is a schematic of a bi-directional transformation between the object in object coordinates and the object in image coordinates according to an embodiment of the invention.

FIG. 2 shows a bidirectional location transformation matrices M and $M^{-1}$ of the location of the object 115 in object coordinates and image coordinates. The location of the object 115 in the object coordinates is a unit square 201. The location of the object 115 in the image coordinates is a tracking region 160 of the image 202. The affine matrix M transforms the unit square 201 at an origin of coordinates 203 to the tracking region 160 enclosing the object in the image according to $$[x_{img} y_{img} 1]^T = M[x_{obj} y_{obj} 1]^T, \quad (2)$$

where, the subscripts indicate the object coordinates (obj) and image coordinates (img), respectively. The inverse transform $M^{-1}$ is also an affine matrix and transforms the object in the image coordinates 160 to the object in the object coordinates 201.

Let I denote the input images 110, and t is the time (frame) index. The tracking estimates the location transformation matrix $M_t$, given the images up to time t, i.e., $I_{0 \ldots t}$, and an initial location transformation $M_0$. A method for detecting the object in an initial image is described below.

The location transformation matrix $M_t$ defines the location of the object 115 at the time t in the object coordinates. We model the location transformations matrix as $$M_t = M_{t-1} \cdot \Delta M_t, \quad (3)$$

and estimate the motion transformations $\Delta M$ at each time (frame) t. The motion transformation $\Delta M$ corresponds to motion of object from time t−1 to time t in the object coordinates 203.

The image in the object coordinates is $I(M^{-1})$. We consider pixel values a tracking region 160 of the object 115 and represent the pixels with a descriptor 175, e.g., gradient orientation histograms. The descriptor (observation) is o($M^{-1}$) ∈ $\mathcal{R}_m$ where m is a dimension of the descriptor 175.

We define tracking as a matrix valued regression problem. Given the previous location of the object as indicated by location transformation matrix, i.e., the tracking region, of the previously processed image $M_{t-1}$, and the current image $I_t$, we estimate a motion transformation $\Delta M_t$ using the regression function 135

$$\Delta M_t = f(o_t(M_{t-1}^{-1})). \tag{4}$$

Object Descriptor

Figure 3:
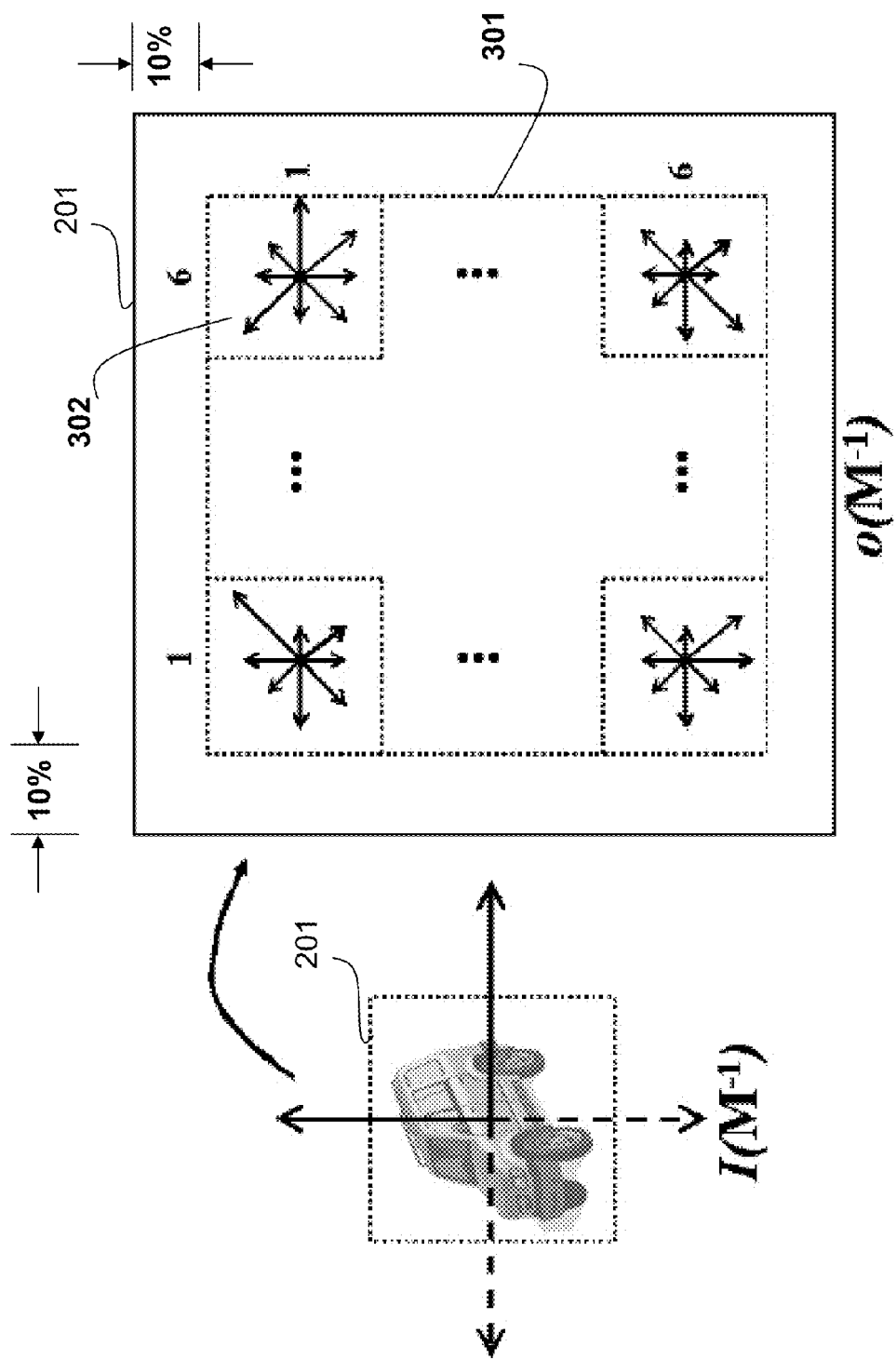
FIG. 3 is a block diagram of a representation of a tracking region with orientation histograms according to an embodiment of the invention.

FIG. 3 shows a representation of the unit square 201 enclosing the object 115. The unit square includes several gradient orientation histograms determined at a regular grid inside the unit square 201 in the object coordinates. Similar to scale invariant feature transform (SIFT) descriptors, the contribution of each pixel to the histogram is proportional to the gradient magnitude of the pixel. The unit square 301 is partitioned into 6×6=36 blocks 302 and a histogram is determined for each block.

Orientations in each histogram are quantized at π/6 degrees between 0 and 2π degrees. Therefore, each histogram is twelve-dimensional, and the object descriptors o are 432 dimensional. During tracking, peripheral pixels in the tracking region are frequently affected by the background. Thus, in one embodiment of the invention, we leave a 10% boundary near the periphery of the tracking region, and determine the descriptor of the object inside the unit square 301.

Regression Function

Figure 4:
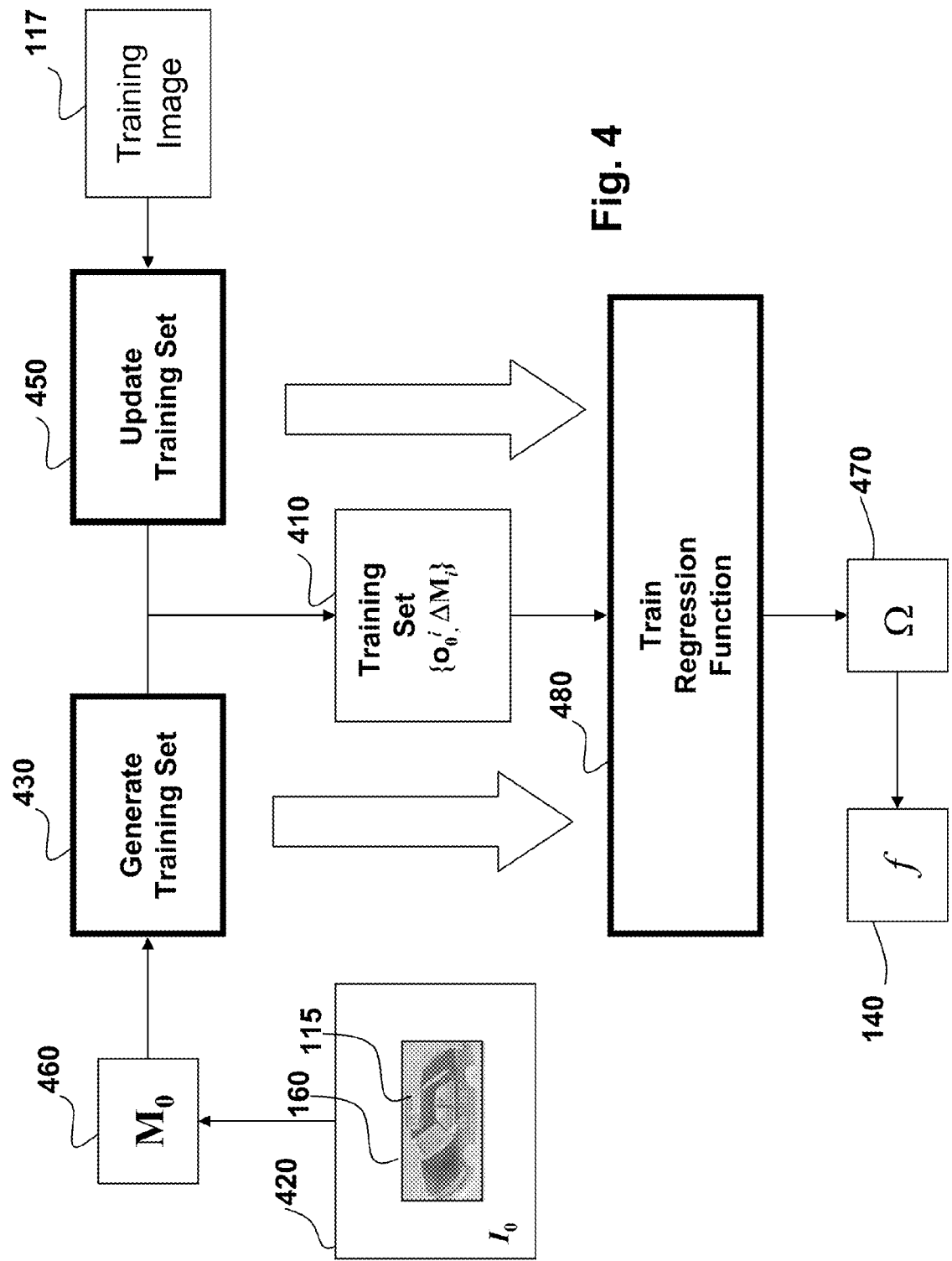
FIG. 4 is a block diagram of a method for training a regression function according to the embodiments of the invention.

FIG. 4 shows a method for training 130 the regression function f 135 according to the embodiments of the invention. The result of the training is an estimation of regression coefficients Ω. The regression coefficients correlate the object descriptors o with the motion transformations ΔM. The way that the regression function is trained and applied to images is the same for the object tracking and the object detecting.

Training Set

During the training, an initial location of the object 115 is approximated by an initial tracking region 160 in an initial (training) image $I_0$ 420 of the sequence 110. The tracking region 160 indicates generally the location of the object 115 according to the image coordinates. Accordingly, the location transformation matrix $M_0$ 460 of the location of the object 115 in the object coordinates is also known. For object detection, the training is supplied with the training image that includes the object, see FIG. 7.

We generate 430 a set of n random parametric motion transformation matrices $\{\Delta M\}_{i=1 \ldots n}$ based on the initial location of the object $M_0$ 460. Each matrix describes a possible motion, e.g., shift, rotation, scale, skew and combination thereof, of the object 115 from the initial location $M_0$ 460. The object 115 at location $M_0$ 460 is transformed by multiplying by the motion transformation $\Delta M_i^{-1}$. The new descriptors are $o_0^i = o_0 (\Delta M_i^{-1} . M_0^{-1})$. The motion transformation $\Delta M_i$ moves the object to the unit square 201. Each motion transformation ΔM is associated with the descriptor o of the object 115 at the location $M_0$ 460. The motion transforms determine a training set 410. The training set 410 include n samples of $\{o_0^i, \Delta M_i\}$.

Figure 5:
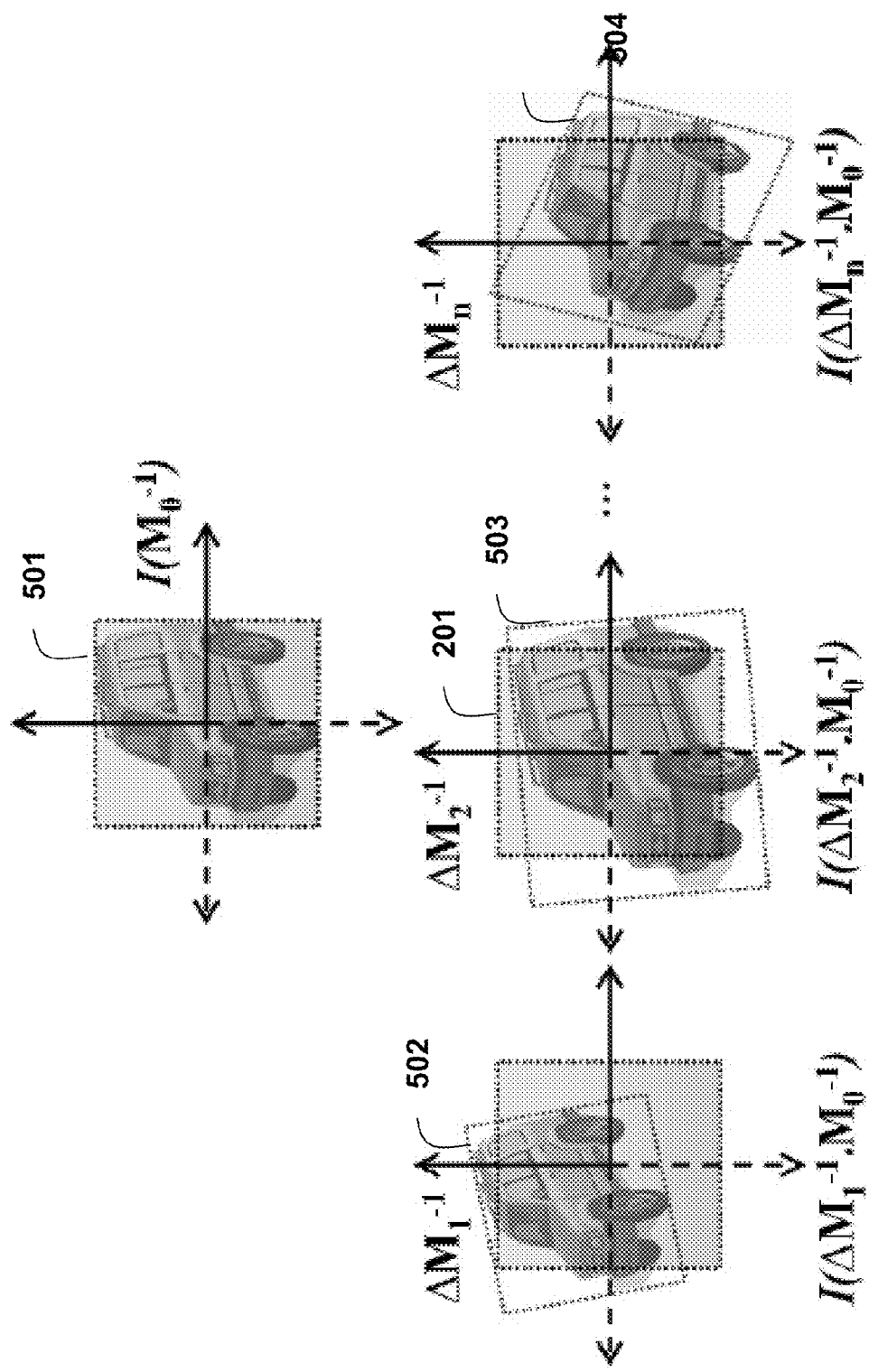
FIG. 5 includes images of a training set according to an embodiment of the invention.

FIG. 5 shows examples 501-504 of the initial training set 410. We use the notation ΔM for motion during training and for the estimated motions during tracking. The subscript i refers to sample in the training set, while the time index t refers to the estimated motion during tracking. In some embodiments, each target image $I_t$ of the sequences 10 is used to update the training set during the tracking. This makes the regression function adaptive to changes in appearance and illumination.

The regression function f: $\mathcal{R}_m \mapsto A(2)$ is an affine matrix. Therefore, the structure of affine matrices is considered.

The conventional method for linear motion estimation uses a parameterization of the motion ΔM(p), and linearizing around the initial value $$\Delta M(p_0 + \Delta p) \approx \Delta M(p_0) + \frac{\partial \Delta M}{\partial p} \Delta p. \tag{5}$$

Because the conventional transformations are around the identity matrix, the linearization is performed at $\Delta M(p_0)=I$. The conventional method proceeds by estimating the increments Δp.

We use the Lie group algebra to train the regression function f 135 from the training set 410. The motion transformations, ΔM 150, are modeled on the Lie algebra as a linear function of the descriptors o 175.

Lie Groups

A d-dimensional manifold is a topological space, which is locally similar to an Euclidean space. Every point on the manifold has a neighborhood for which there exists a homeomorphism, which maps the neighborhood to $\mathcal{R}^d$.

Differentiable manifolds satisfy smoothness constraints. Therefore, it is possible to define the derivatives of the curves on the manifold. The derivatives at a point M on the manifold lie in a vector space, which is the tangent space at that point. A Lie group is a group G with the structure of a differentiable manifold such that the group operations, multiplication and inverse, are differentiable maps. The tangent space to the identity element I of the group forms the Lie algebra g. We refer to points on the group with bold upper case letters and vectors on the Lie algebra with bold lower case letters.

Distances on the manifold are measured by the lengths of the curves connecting points, and a minimum length curve is called a geodesic. From the identity element I, there exists a unique geodesic starting with the vector m ∈ g. The exponential map, exp:g→G maps the vector m to the point reached by this geodesic. If exp(m)=M, then the length of the geodesic is ρ(I,M)=‖m‖. In general, the exponential map is onto but not one-to-one. Therefore, the inverse mapping log: G→g is uniquely defined only around the neighborhood of the identity element I. If for any M ∈ G, there exist several m ∈ g such that M=exp(m), then log(M) is selected as the vector with the smallest norm. Left multiplication by the inverse of a group element $M^{-1}$:G→G maps the point M to I and the tangent space at M to the Lie algebra, which is an isomorphism. Using the mapping and the geodesic definition, the distance between two group elements is measured by $$\rho(M_1, M_2) = \|\log(M_1^{-1} M_2)\|. \tag{6}$$

The transformations we use in the embodiments of the invention, such as affine motion A(2), similarity transform S(2), and Euclidean motion SE(2), are closed subgroups of the general linear group GL(3,R), which is the group of 3×3 nonsingular square matrices. The exponential map of a matrix and its inverse, logarithm map, are defined by $$\exp(m) = \sum_{n=0}^{\infty} \frac{1}{n!} m^n \log(M) = \sum_{n=1}^{\infty} \frac{(-1)^{n-1}}{n} (M - I)^n. \quad (7)$$

In general, the exponential map does not satisfy the identity $\exp(m_1)\exp(m_2) = \exp(m_1+m_2)$.

The mapping is defined by $\exp(m_1)\exp(m_2) = \exp(BCH(m_1, m_2))$, through Baker-Campbell-Hausdorff formula $$BCH(m_1, m_2) = m_1 + m_2 + \frac{1}{2}[m_1, m_2] + O(|(m_1, m_2)|^3), \quad (8)$$

where $[m_1, m_2] = m_1 m_2 - m_2 m_1$ is the Lie bracket operation. The structure of affine matrices is described above. The space is a six-dimensional manifold.

The Lie algebra of the affine group is the set of matrices $$m = \begin{pmatrix} U & v \\ 0 & 0 \end{pmatrix}, \quad (9)$$

where, U is a 2×2 matrix and $V \in \mathcal{R}^2$. The matrix m is sometimes referred to as a six-dimensional vector by selecting each of the entries of the matrix U and the vector v as an orthonormal basis.

Regression Function Training

During the training 480 based on the training set 410, the regression coefficients $\Omega$ 470 are estimated. The regression coefficients 470 correlate the object descriptors o with the motion transformations $\Delta M$. For the purpose of this description, the regression coefficients $\Omega$ 470 equivalent to the regression function 140.

The training set 410 includes the descriptors and the motion transformations $\{o^i_0, \Delta M_i\}$ as described above. The affine motion matrices do not lie on a vector space and the conventional Euclidean distance between two motions is not a valid metric.

However, affine motion matrices do lie on the differentiable manifold. In this case, a meaningful error function is a sum of the squared geodesic distances between the regression estimations, $f(o^i_0)$, and the motion transformations $\Delta M_i$ $$J_g = \sum_{i=1}^{n} \rho^2 [f(o^i_0), \Delta M_i]. \quad (10)$$

Let $M_1$ and $M_2$ be two motion matrices, and let $m_1 = \log(M_1)$ and $m_2 = \log(M_2)$. A first order approximation to the geodesic distance between the two motion matrices is $$\rho(M_1, M_2) = \|\log[M_1^{-1} M_2]\| \quad (11)$$
$$= \|\log[\exp(-m_1)\exp(m_2)]\|$$

-continued
$$= \|\log[\exp(m_2 - m_1 + O(|(m_1, m_2)|^2)]\|$$
$$\approx \|m_2 - m_1\|.$$

using BCH formula of Equation (8).

If we select d orthonormal bases on the Lie algebra, then we can determine the matrix norm as the Euclidean distance between two vectors. From the BCH formula of Equation (8), and the definition of Lie bracket operation, the approximation is better for smaller transformations, such that $m_1$ and $m_2$ are close to zero, or equivalently $M_1$ and $M_2$ are close to identity matrix I. Using Equation (11), the error function of Equation (10) is equivalent to minimizing $$J_a = \sum_{i=1}^{n} \|\log(f(o^i_0)) - \log(\Delta M_i)\|^2, \quad (12)$$

up to first order terms. Because the transformations are in a small neighborhood of the identity matrix, the approximation sufficiently accurate.

We define the regression function as $f(o) = \exp(g(o))$, (13)

and determine the function $g: \mathcal{R}_m \mathcal{R}_m \mapsto \mathcal{R}_d$, which estimates the tangent vectors, $\log(\Delta M)$, on the Lie algebra. We model the function g as a linear function of the descriptors $g(o) = o^T \Omega$, (14)

where $\Omega$ is the m×d matrix of regression coefficients. Let X be the n×m matrix of initial descriptors and Y be the n×d matrix of mappings of motions to the Lie algebra $$X = \begin{pmatrix} [o^1_0]^T \\ \vdots \\ [o^n_0]^T \end{pmatrix} \quad (15)$$

$$Y = \begin{pmatrix} [\log(\Delta M_1)]^T \\ \vdots \\ [\log(\Delta M_n)]^T \end{pmatrix}.$$

The $\log(\Delta M_1)$ is referred here in d-dimensional vector form.

Substituting Equations (13) and (14) into Equation (12), we obtain $$J_a = tr[(X\Omega - Y)^T(X\Omega - Y)], \quad (16)$$

where the trace (tr) replaces the summation in Equation (12). The trace is a sum of the elements on the main diagonal. If we differentiate the error function $J_a$ with respect to $\Omega$, then the minimum is $\Omega = (X^T X)^{-1} X^T Y$.

For real-time tracking, the number of descriptors is relatively small, e.g., n=200. Because the number of descriptors is smaller than the dimension of the feature space, m=432, n<m, the system is underdetermined and $X^T X$ becomes rank deficient. In this case, the estimate makes the training error zero. However, the error does not generalize to future predictions, which is called overfitting.

To avoid overfitting, we provide an additional constraint on the size of the regression coefficients $$J_r = tr[(X\Omega - Y)^T(X\Omega - Y)] + \lambda \|\Omega\|^2, \quad (17)$$

which is a ridge regression, where T is the transform operator. Ridge regression is useful for solving badly conditioned linear regression problems.

The minimum of the error function $J_r$ is $$\Omega = (X^T X + \lambda I)^{-1} X^T Y, \tag{18}$$

where I is an m×m identity matrix. A regularization coefficient λ determines the degree of shrinkage on the regression coefficients. Larger values of the coefficient λ stabilize the motion, whereas smaller values allow larger motions from frame to frame. The optimum value of the coefficient λ is selected by cross validation on a training sequence, with λ remaining constant throughout the tracking.

After training the model by randomly generating motion parameters in the first frame, the update process is very fast at the consecutive frames as it requires only simple matrix multiplications.

Sequential Importance Sampling

The regression tracking requires overlap of the object window, i.e., states, between the adjacent images. Thus, the regression tracking fails in case of large motion changes where such overlap could not be satisfied.

To overcome this problem, embodiments of the invention use sequential importance sampling (SIS), where a set of particles, i.e., samples, are drawn over a large search space. SIS is a Monte Carlo (MC) method that forms the basis for most sequential MC filters developed over the past decade, and also known as bootstrap filtering, the condensation algorithm, survival of the fittest, and the most popularly as the particle filter.

The key idea is to represent the posterior density function (of the pose object for instance) by a set of random particles with associated weights and to compute estimates based on these samples and weights. However, according to the Bayesian theory, the weighted average of the particles converges to the true state of the object when the number of samples is large, which is computationally infeasible.

Regressing Particles

In the regressing particle filter according the embodiments of our invention, the state of each particle corresponds to motion parameters represented as a vector. Other representations of the state of the particle are possible. We vectorize the motion parameters as $$M \rightarrow v \equiv [a\ b\ c\ d\ x\ y]^T \tag{19}$$

where a, b, c, d, x, and y are the motion parameters. We denote the $i^{th}$ particle at time t as $v_t^i$, and a weight of the particle $v_t^i$ as $w_t^i$. The observation $I_t$ is the target image at time t. The particles 140 $\{v_t^i, i=1, 2, \ldots, n\}$ are generated from a proposal density q(•). Alternatively, as described above, the particles 140 can be acquired from the moved particles 155 of the previous iteration of the method 100.

The weights at time t are updated by $$w_t^i \propto w_{t-1}^i \frac{p(I_t | v_t^i) p(v_t^i | v_{t-1}^i)}{q(v_t^i | v_{t-1}^i, I_t)}, \tag{20}$$

where $q(v_t^i | v_{t-1}^i, I_t)$ is a proposal density from which the particles $v_t^i$ have been generated. The normalized weights $\pi_t^i$ are given by $$\pi_t^i = \frac{w_t^i}{\sum_{j=1}^n w_t^j}.$$

The object state $\hat{v}_t$ 120 is determined by the sample mean $$\hat{v}_t = \sum_{i=1}^n \pi_t^i v_t^i. \tag{21}$$

In Equation (20), $p(I_t | v_t^i)$ is the likelihood of the $i^{th}$ particle given by $$p(I_t | v_t^i) = e^{-\frac{D^2}{2\sigma^2}}, \tag{22}$$

where D is the dissimilarity, e.g. by Bhattacharya distance, of the gradient weighted orientation histograms between the 2D image region corresponding to $v_t^i$ and the target image. $p(v_t^i | v_{t-1}^i)$ is the transition probability, and is determined by the motion dynamics (history) of the object. This is learned through the data. $q(v_t^i | v_{t-1}^i)$ is the proposal density that generates the samples. In our case, we first draw samples from a Gaussian probability density, $$v_{t,m}^i = v_{t-1}^i + N(0, C). \tag{23}$$

where $v_{t,m}^i$ stands for the intermediate samples of $v_t^i$; N(0,C), i.e. a Gaussian distribution with zero mean and covariance matrix C.

To refine the position of the particle in the space such that the underlying domain fits better to the object model, we apply the regression tracker. We map back the vector to matrix form v→M, and $$M_t^i = M_{t,m}^i \Delta M_t^i = M_{t,m}^i f(o_t(M_{t,m}^{-1})). \tag{24}$$

The regression can be applied directly to the vector representation of the particle. Typically, we use a closed form expression of the proposal density $q(M_t^i | M_{t-1}^i, I_t)$ based on the way we generate the samples, i.e. Equations (23) and (24).

However, the regression tracking is a mapping from the feature density to transformation space. The low-level feature we utilized, the gradient histogram $o_t(M_{t,m}^{-1})$ in Equation (24), prevents deriving the closed form expression.

Accordingly, we sample the particles to match the transformation dynamics of the object, i.e. $p(v_t^i | v_{t-1}^i) = q(v_t^i | v_{t-1}^i, I_t)$. Then Equation (20) reduces to $$w_t^i \propto w_{t-1}^i p(I_t | v_t^i) \tag{25}$$

Object Tracking

Step 1: Acquire Particles

Referring to FIG. 1, the method 100 is executed iteratively for each target image in the sequence 100. We acquire the set of particles 140 ass. In one embodiment, we acquire the set of particles according to Equation (23). Alternatively, the set of particles 140 can be updated from the set of moved particles 155 determined in the previous iteration of the method 100.

Step 2: Regression for Each Particle

For each particle in the set of particles we determine 150 the motion 155 using the regression function 135.

FIG. 6 shows pseudo code for motion determination 150. We train the regression function $f$ 135. We determine the motion of each particle using Equation (4). The motion determination can be improved by repeating the motion estimation with the regression function $f$. The iterations end when the estimated motion $\Delta M_t$ becomes equal to identity, or the likelihood of the particle at the current estimated location becomes less than the likelihood of the particle at the previous location. The likelihood of the particle being at location M at time t is $$L(M,t) = \|o_t(M^{-1}) - o_0(M_0^{-1}))\|^{-1}, \quad (26)$$

where the descriptor of the particle at the previous location is compared with the descriptor of the particle at the current location. Usually, one or two iterations per image are sufficient for tracking the particle.

Step 3: Estimate the Object State

We map each moved particle in the set 155 back to the motion state, and calculate average weight of the moved particles according Equation (25). Next, we determine a new value of the object state 120 according to Equation (21).

EXAMPLES

There is a correlation between the way we draw particles from the proposal density function and generate the random motions for the regression function training. In our embodiments, the particle filter is designed to compensate for the rather large translations than the rotations and scale.

We performed extensive tests on both synthetic sequences as well as real-world videos. In each test, we compared our method with the regression tracker and the particle filter.

For all test samples, we applied the histogram of oriented gradients (HOG) descriptors with 288 coefficients. Similar to SIFT descriptors, the contribution of each pixel to the histogram is proportional to its gradient magnitude. The unit square is divided into 6×6=36 regions and a histogram is computed in each of them. Each histogram is quantized at $\pi/4$ degrees between 0 and $2\pi$. The size of each histogram is eight dimensional and the descriptors, o, are m=288 dimensional. During tracking the peripheral pixels are frequently contaminated by the background, hence we leave a 10% boundary at the out side of the unit square and construct the descriptor inside the inner rectangle.

We estimated the six parameters of the 2D affine transformation model as the pose of the objects, were each coefficient has identical importance. The regression model is trained only at the first frame and remained constant during the tracking process. We generated a training set of 200 samples by random affine transformations of a single object. The motions are generated on the Lie algebra, by giving random values between −0.1 and 0.1 to each of the six state parameters, and mapped to affine matrices via exponentiation.

We also analyzed assigning the first half of the motions by giving small random perturbations (−0.05 to 0.05) to rotation and scale parameters A and larger values (0.3 to 0.3) to translation T, and the other half by giving large random values to A and small values to T, which is observed to be more likely to keep track of object for the sequences depicting significantly erratic pose changes.

For synthetic sequences where the ground truth affine parameters are available we performed a single tracking iteration by each method, and simply measured the mean squared error (MSE) on all six parameters as $$\frac{1}{n}\sum_{t}^{n} \|v_t - \hat{v}_t\|^2 \quad (27)$$

instead of the geodesic distance between the estimations and the true values. Notice that, although we track the targets with an affine model, some targets are not planar. Therefore, an affine model can not perfectly fit the target but still produces the best affine approximation.

In order to perform a comparison, we kept the proposal density functions in both the conventional particle filter and our method same. In addition, the number of particles in the conventional particle filter is empirically selected such that the CPU times of both methods are almost equal. Gradient information is used as the only cue to calculate the likelihood in the particle filter and the region descriptors in the regression tracking. We prove that the integration of the regression tracker into the particle filter significantly improves the performance of tracking.

Effect of the Invention

Embodiments of the invention provide a novel method for object tracking that integrates the regression pose estimate on Lie algebra into the sequential importance sampling particle filter. Our method provides more accurate results than the conventional particle filter with tenfold particles, and recovers large translational motion unlike the conventional regression tracker on Lie algebra. Our method is not restricted to the affine motion and can be easily extended to more complex parametric motions.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for tracking an object from a training image to a target image, wherein the training image and the target image are elements of a sequence of images, wherein the object in the training image is represented by an object state, comprising a processor for performing steps of the method, comprising the steps of:
    acquiring a set of particles, wherein each particle is associated with a weight, such that the particle represents the object state with a probability equal to the weight, wherein the weight is an element in a set of weights, such that each particle in the set of particle is associated with a corresponding weight;
    applying, using the processor, a regression function to each particle in the set of particles based on a target image to determine a set of moved particles;
    updating the set of weights according to the set of moved particles, and
    updating the object state according to the set of moved particles, such that the object state represents the object in the target image.

2. The method of claim 1, further comprising:
    training, before the applying, the regression function based on the object state.

3. The method of claim 1, further comprising:
    training, in response to the updating, the regression function based on the object state.

4. The method of claim 1, wherein the applying further comprising:
    determining: a motion transformation for each particle in the set of particles.

5. The method of claim 4, wherein the regression function is $f$, a descriptor of a particle is $o(M^{-1}) \in \mathcal{R}_{m}{}^{m}$ where m is a dimension of the object descriptor, and the motion transformations is $$\Delta M_t = f(o_t(M_{t-1}^{-1})).$$

6. The method of claim 5, wherein a state of the particle at a time is described by a location transformation matrix $M_t$, and a motion of the particle is described by a motion transformations $\Delta M_t$, such that $$M_t = M_{t-1} \cdot \Delta M_t.$$

7. The method of claim 1, wherein the updating further comprising:
  calculating an average weight based on the set of moved particles; and
  determining the object state based on the average weight and the set of moved particles.

8. The method of claim 1, wherein the acquiring further comprising:
  determining the set of particles according to a Gaussian probability density based on the object state.

9. The method of claim 1, wherein the acquiring further comprising:
  determining: the set of particles based on the set of moved particles.

10. The method of claim 1. NV herein the acquiring further comprising:
  updating the training image with the target image; and
  updating the target image with a next image in the sequence of images.

11. A system for tracking an object from a training image to a target image, wherein the training image and the target image are elements of a sequence of images, wherein the object in the training image is represented by an object state, comprising a processor, the system comprising:
  means for acquiring a set of particles, wherein each particle is associated with a weight, such that: the particle represents the object state with a probability equal to the weight;
  means for applying, using the processor, a regression function to each particle based on a target image to determine a set of moved particles; and
  means for updating the object state according to the set of moved particles, such that the object state represents the object in the target image, wherein the means for updating calculates an average weight based on the set of moved) articles, and determines the object state based on the average weight and the set of moved particles.

12. A method for tracking an object from a training image to a target image, wherein the training image and the target, image are elements of a sequence of images, wherein the object in the training image is represented b an object state, comprising a processor for performing steps of the method, comprising the steps of:
  acquiring a set of particles, wherein each particle is associated with a weight, such that the particle represents the object state with a probability equal to the weight, wherein the acquiring includes determining the set of particles according to a Gaussian probability density based on the object state;
  applying, using the processor, a regression function to each particle in the set of particles based on a target image to determine a set of moved particles; and
  updating the object state according to the set of moved particles, such that the object state represents the object in the target image.

* * * * *